United States Patent [19]

Buls et al.

[11] 4,138,065

[45] Feb. 6, 1979

[54] DEVICE FOR PREPARING FIBRE-FILLED POLYMERIC COMPOSITIONS

[76] Inventors: Yanis I. Buls, ulitsa Deglava, 17, kv. 7, Jurmala; Gunar E. Gailis, ulitsa Popova, 14, kv. 1, Riga; Sofia M. Borovikova, ulitsa Kravchenko, 4, korpus 1, kv. 21, Moscow; Evgeny V. Lurie, ulitsa Solnechnaya, 9, Moskovskaya oblast, stantsia Udelnaya; Valery F. Mikhailov, Schelkovskoe shosse, 86, kv. 28, Moscow, all of U.S.S.R.

[21] Appl. No.: 829,345

[22] Filed: Aug. 31, 1977

[51] Int. Cl.² ............................................. B02C 23/28
[52] U.S. Cl. ................................. 241/55; 241/101 D
[58] Field of Search ............ 241/54, 55, 101 D, 101.6, 241/282.1

[56] References Cited

U.S. PATENT DOCUMENTS

| 887,894 | 5/1908 | Wilder | 241/55 |
|---|---|---|---|
| 2,314,251 | 3/1943 | Smith et al. | 241/55 |
| 2,605,800 | 8/1952 | Matev | 241/55 |

Primary Examiner—Granville Y. Custer, Jr.
Attorney, Agent, or Firm—Burgess, Ryan and Wayne

[57] ABSTRACT

A characteristic feature of the proposed device for preparing fibre-filled polymeric compositions having a fibre-chopping mechanism within a blender chamber and formed by a stationary plate with a draw-nozzle having a sharpened lip and by a rotary cutter adjacent to said plate, both the cutter and the sharpened lip establishing the chopping zone for the fibre passing through the draw nozzle. The cutter, while rotating, produces a vortex-type turbulent air flow, wherein the chopped fibre is intermixed with the polymer. The draw-nozzle communicates with the intake pipe for the fibre to feed through the draw-nozzle to the chopping zone.

2 Claims, 4 Drawing Figures

DEVICE FOR PREPARING FIBRE-FILLED POLYMERIC COMPOSITIONS

This invention relates generally to equipment for producing and processing plastics and more specifically, to a device for preparing fibre-filled polymeric compositions.

The invention can find application at chemical-engineering plants specialized in processing technical-use plastics, as well as in radio-, electrical-, mechanical-, motor-car, and some other engineering industries.

It is widely known to use some devices for producing plastics. In particular, there can be cited an American extrusion machine for preparing fibre-filled polymeric compositions, incorporating a screw enclosed in a cylinder provided with a heating jacket, and a polymer feed hopper. See for example U.S. Pat. No. 3,453,356.

The machine operates as follows.

Polymer is fed from the hopper to the charging zone of the extruder screw to be caught by the fillets thereof, whereby the polymer is conveyed inside the cylinder gets melted therein, as the jacket enclosing the cylinder is heated. Next, the molten polymer is agitated and exposed to compression while passing along the screw channel, whereupon the polymer is fed to the degassing zone located in the central screw portion, the pressure applied thereto drops to zero due to larger volumetric space of the screw channel. An opening is provided in the cylinder within the degassing zone, adapted for feeding the chopped fiber glass in strictly proportioned doses. Then the fiber glass is caught by the screw fillets and while being driven forward it is intermixed with the polymer melt.

The resulting blend is subjected to compression again and is extruded through the extruder head provided at the screw outlet to get into the cooling bath. The thus-prepared plastics rod stock is then cut into granules of a specified size, and the granules are subjected to further processing.

However, as the aforediscussed device makes use of expensive extruders, the stage of preliminary preparation of fiber glass filled granulated material on the extruder adds much to the cost of the process as a whole.

Moreover, the device in question fails to provide the preparation of a homogeneous blend of components unless the latter are not heated. On the other hand, any heating of the material is responsible for adversely affected physico-mechanical characteristics of the composition owing to destruction of the polymer and disintegration of the fiber glass component.

Other methods and machines for preparation of fiber-filled polymeric compositions are described in U.S. Pat. Nos. 3,393,834 and 3,520,027.

One more prior-art plant for preparing fibre-filled polymeric compositions has been patented (U.S. Pat. No. 3,520,027) by the American firm "The Dow Chemical Company" in a number of modifications. The plant incorporates a polymer feeder, a chopper device for a proportioned feeding of fibre, and chamber for blending the fibre with the polymer. The streams of the polymer and the chopped fibre are passed into the chamber where they are mixed while freely falling. The resultant dry composition is further advanced for being processed into finished products.

However, said plant also fails to provide a complete intermixing of the components into a homogeneous blend, as the quality of the latter depends upon the height of free falling of both components of the composition; thus, to provide an adequately large height the means of feeding the components into the blender chamber should be situated at a reasonably large height which adds to the overall size of the plant.

Besides, large falling height of the chopped fibre leads to an abnormally high degree of dust content of the atmosphere of production rooms which tells adversely on the labour conditions of the attending personnel.

It is a general object of the present invention to eliminate the disadvantages mentioned above.

It is a specific object of the present invention to provide a device for preparing fibre-filled polymeric compositions that would feature a space-saving design and such a construction that makes it possible to increase the rate of fibre feed to the blender chamber, prepare a homogeneous composition in that chamber and let the thus-obtained composition out of the blender chamber.

Said and other objects are accomplished by providing a device for preparing fibre-filled polymeric compositions, incorporating a chamber for blending the fibre passed through the chopper mechanism, with a powdery or granulated polymer to obtain a homogeneous polymeric composition, according to the invention the fibre chopper mechanism is enclosed in the blender chamber and is defined by a stationary plate with a draw-nozzle having a sharpened lip, and by a rotary cutter adjacent to said plate, both said cutter and said sharpened lip establishing the fibre chopping zone for the fibre passed through the draw-nozzle, whereas said cutter, while rotating, produces a turbulent air flow for the chopped fibre and polymer to intermix, and said draw-nozzle is communicated with the intake pipe for the fibre to feed through the draw-nozzle to the chopping zone.

It is expedient that the intake pipe be provided with an inlet connection for compressed air, and that said inlet connection be situated tangentially with the inside surface of the intake pipe, while its axis makes an angle of 15° to 75° with the axis of the intake pipe.

The essence of the present invention resides in the following.

The fibre, moving through the intake pipe, passes into the chopping zone established by the sharpened lip of the draw-nozzle of the stationary plate and the blades of the cutter rotatably mounted inside the blender chamber. A strictly proportioned amount of the chopped fibre is entrained by the vortex-type turbulent air flow developed by the rotating cutter to be chopped into monofilaments. A controlled flow of the polymer material is also advanced from the feeder to the central zone of the blender chamber, is entrained there by the vortex-type turbulent air flow and transferred along a spiral path from the centre of the chamber towards the periphery thereof. Both the fibre and the polymer while in the blender chamber, have time enough to make a few revolutions along with the turbulent air flow and get intermixed therein. The thus-obtained composition proves to be more homogeneous due to an intentionally lengthened path of the joint flight of the components and owing to turbulent conveying medium (i.e., air).

It should be pointed out that the thus-developed air stream can be utilized for conveying the prepared composition for further processing.

The fact that the fibre is chopped and intermixed with the polymer within the chamber exposed to rarefaction, the degree of dustiness of the environmental atmosphere is drastically reduced in the course of mixing the components.

Mixing of the components in a vortex-type turbulent air flow makes it possible to intentionally lengthen the spiral path along which the components perform a joint flight within a rather small blender chamber which at the same time enables the overall size of the entire device to be substantially diminished and the degree of homogeneity of the produced blend (composition) to be increased.

Application of an intake pipe with a sloping inlet connection enables the provision of a reliable fibre feeding to the chopping zone at a high linear velocity, whereas the vortex-type turbulent air flow thus established ensures rapid evacuation of the resultant composition from the blender chamber.

The device of the afore-discussed constructional arrangement, though of a minimized overall size, features high productivity.

The present device for preparing fibre-filled polymeric compositions is capable of producing dry fibre-filled compositions featuring a high degree of homogeneity without resorting to any preheating of the component material. On the one hand this feature cuts down the prime cost of the products made of fibre-filled compositions by 15 to 20 percent, this being due to the fact that the process dispenses with expensive extrusion equipment for producing fibre-filled granules, while on the other hand, the quality of the finished products gets as high as 10 to 25 percent more than that of some other kinds of processing fibre-filled polymeric compositions.

As the overall size of the device for preparing fibre-filled polymeric compositions is small, this enables the device to be easily and unobstructedly incorporated into a common flowsheet of the plant for manufacturing the products from fibre-filled polymeric compositions. The device has a sufficiently high production output as to be able to operate in conjunction with at least three plants for processing the compositions into finished products.

The process for preparing the composition occurs in an enclosed chamber exposed to rarefaction which precludes dust ingress into the production room and facilitates labour conditions of the operator.

The herein-proposed device for preparing fibre-filled polymeric compositions is convenient in attendance and operates on an automatic production schedule in accordance with the operating cycle of the respective plant for manufacturing the products from fibre-filled polymeric compositions.

For a better understanding of the character of the present invention, the following illustrative examples of the specific embodiments thereof are given hereinbelow.

Figure 1:
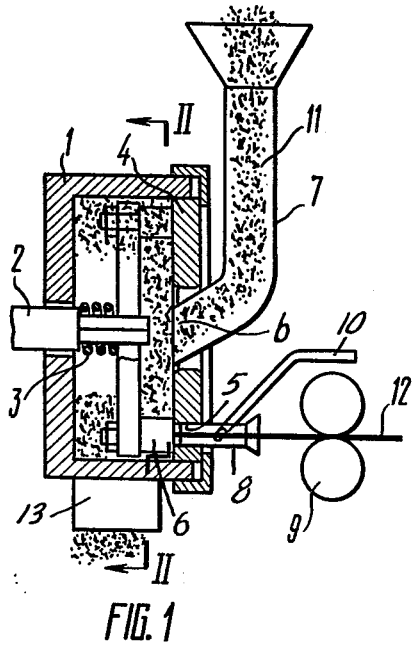
FIG. 1 is a general schematic view of a device for preparing fibre-filled polymeric compositions, according to the invention.
Figure 3:
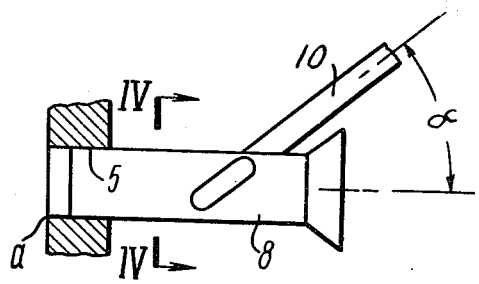
FIG. 3 is a side elevational view of the intake pipe with the inlet connection.

Now referring to the appended drawings, FIG. 1 represents the device for preparing fibre-filled polymeric compositions as incorporating a cylinder-shaped blender chamber 1 made either sectionalized or as an integral unit from a solid piece of metal, said chamber accommodating a drive shaft 2 with a spring 3 of the fibre chopping mechanism. The latter mechanism is located inside the blender chamber 1 and is formed by a stationary plate 4 with a draw-nozzle 5 having a sharpened lip a (FIG. 3) and by a cutter 6 adjacent to said plate. The plate 4 is held to the shell of the blender chamber 1 so as to establish one of the walls thereof.

A hole b is provided in the central portion of the stationary plate 4 for the granular or powdery polymer to feed from a hopper 7 into a blender chamber 1. The cutter 6 is mounted on the drive shaft 2 in such a manner as to be free to traverse along the axis of said shaft, whereby the cutter is tightly pressed by the spring 3 against the stationary plate 4. The draw-nozzle 5 of the plate 4 communicates with an intake pipe 8 for the fibre to feed from the two oppositely rotatable rolls 9 forced against each other and provided ahead of the intake pipe 8, to the chopping zone formed by the rotary cutter 6 and the sharpened lip a of the draw-nozzle 5. The intake pipe 8 has an inlet connection 10 for compressed air to supply therein, said inlet connection being arranged tangentially to the inside surface of the intake pipe 8, while the axis of the connection 10 makes up an angle $\alpha$ of 15° to 75°. with the axis of the intake pipe 8.

The device of the invention operates as follows.

Figure 2:
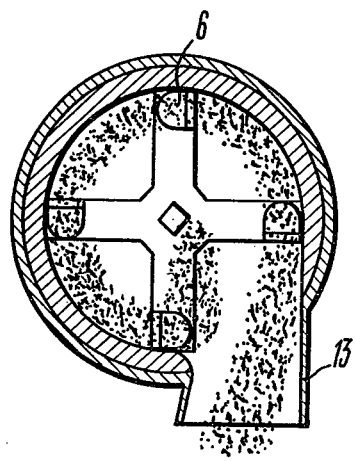
FIG. 2 is a section taken along the line II—II in FIG. 1.
Figure 4:
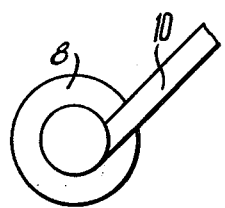
FIG. 4 is a section taken along the line IV—IV in FIG. 3.

The motor (not shown) sets in rotation the shaft 2 and the cutter 6 carried by the latter. Rotation of the cutter 6 develops a vortex-type turbulent air flow (FIG. 2) in the blender chamber 1 which draws the flow of polymer 11 fed from the hopper 7 through the hole b in the plate 4 into the blender chamber 1. Concurrently with the feeding of the polymer 11, fibre 12 fed into the rarefied zone of the intake pipe 8, is passed through the rolls mechanically associated with the drive shaft 2. Compressed air supplied from the inlet connection 10 conveys the fibre 12 found in the intake pipe 8, through the draw-nozzle 5 to the chopping zone established by the sharpened lip a of said draw-nozzle 5 and the blades of the rotary cutter 6. The blades of the cutter 6 run against the sharpened lip a, thus effecting the chopping of the fibre 12 continuously fed through the draw-nozzle 5 into strictly specified lengths preset by the gear ratio between the drive shaft 2 and the rolls 9. The stream of the chopped fibre is caught by the vortex-type turbulent air flow generated inside the chamber 1, and is intermixed therein with the stream of the polymer 11.

The polymer and fibre being non-sluggish materials, the resultant blend has time enough to perform a few revolutions along with the vortex-type turbulent air flow which contributes to producing a homogeneous composition. Then the stream of the thus-prepared composition is fed from the blender chamber 11 through an outlet connection 13 for further processing.

What is claimed is:

1. An apparatus for preparing fibre-filled polymeric compositions, which comprises a chamber for blending the fibre with powdery or granular polymer to obtain a homogeneous polymeric composition; a fibre-chopping mechanism inside the blender chamber comprising a stationary plate with a draw-nozzle having a sharpened lip and a rotary cutter adjacent to said plate so as to form with said plate a chopping zone for the fibre passed through the draw-nozzle; said rotary cutter, while rotating, developing a vortex-like turbulent air flow for intermixing the chopped fibre with the polymer; an intake pipe communicating with the draw-nozzle for the fibre to feed through the draw-nozzle to the chopping zone and means for feeding a flow of polymer to the blending chamber.

2. A device as claimed in claim 1, wherein the intake pipe has an inlet connection for compressed air to feed therein, said connection being positioned tangentially with the inside surface of the intake pipe as as to make up an angle of 15°–75° with the intake pipe axis.

* * * * *

UNITED STATES PATENT OFFICE
CERTIFICATE OF CORRECTION

Patent No. 4,138,065      Dated February 6, 1979

Inventor(s) Yanis I. Buls, et al

It is certified that error appears in the above-identified patent and that said Letters Patent are hereby corrected as shown below:

In the title page, in the Abstract, line 1: delete "characteristic feature of the proposed".

Column 1, line 18: after "See" insert a comma; after "example" insert a comma.

Column 2, line 9: "labour" should be --labor--.

line 25: "composition, according" should be --composition. According--.

line 62: after "to" insert --the--.

Column 3, line 41: "labour" should be --labor--.

Column 4, line 19: after "75°" cancel the period.

UNITED STATES PATENT OFFICE
CERTIFICATE OF CORRECTION

Patent No. 4,138,065             Dated February 6, 1979

Inventor(s) Yanis I. Buls, et al

It is certified that error appears in the above-identified patent and that said Letters Patent are hereby corrected as shown below:

Column 4, line 28: after "rolls" insert --9--.

penultimate line: "as as" should be --as--.

*Signed and Sealed this*

*Seventeenth* Day of *July 1979*

[SEAL]

Attest:

LUTRELLE F. PARKER
*Attesting Officer*     *Acting Commissioner of Patents and Trademarks*